United States Patent [19]

Lenherr

[11] Patent Number: 5,322,154
[45] Date of Patent: Jun. 21, 1994

[54] CONVEYOR FOR FORMING A COLUMN OF UNIFORMLY SPACED ARTICLES

[75] Inventor: Harald Lenherr, Beringen, Switzerland

[73] Assignee: SIG Schweizerische Industrie-Gesellschaft, Neuhausen am Rheinfall, Switzerland

[21] Appl. No.: 623,507

[22] Filed: Dec. 7, 1990

[30] Foreign Application Priority Data

Dec. 8, 1989 [CH] Switzerland .................. 4423/89

[51] Int. Cl.$^5$ ............................................. B65G 47/26
[52] U.S. Cl. ......................... 198/460; 198/594; 198/812
[58] Field of Search ............... 198/459, 460, 461, 594, 198/812

[56] References Cited

U.S. PATENT DOCUMENTS

| | | | |
|---|---|---|---|
| 3,370,693 | 2/1968 | Marsden | 198/460 |
| 4,681,523 | 7/1987 | Thelen | 198/461 X |
| 4,881,357 | 11/1989 | Ballestrazzi et al. | |
| 4,881,635 | 11/1989 | Raschke | 198/460 |

FOREIGN PATENT DOCUMENTS

| | | |
|---|---|---|
| 1456521 | 1/1969 | Fed. Rep. of Germany . |
| 2711039 | 9/1978 | Fed. Rep. of Germany . |
| 7826035 | 9/1978 | Fed. Rep. of Germany . |
| 3147590 | 12/1981 | Fed. Rep. of Germany . |
| 3630791 | 10/1987 | Fed. Rep. of Germany . |

Primary Examiner—Joseph E. Valenza
Assistant Examiner—Tuan N. Nguyen
Attorney, Agent, or Firm—Spencer, Frank & Schneider

[57] ABSTRACT

An apparatus for forming a column of spaced articles has a supply belt and a downstream-adjoining removal belt. The article transfer location between the two belts is formed by belt-supporting end rollers, one defining the downstream end of the supply belt and the other defining the upstream end of the removal belt. The two rollers together define an article transfer location. The two belt-supporting end rollers are mounted on a first carriage which is movable parallel to the conveying direction and which is attached to the upper reach of an endless flexible element. A second carriage is secured to the lower reach of the flexible element. On the second carriage there are mounted two deflecting rollers about which the supply belt and the removal belt are trained, respectively. The endless flexible element is supported by end rollers and is driven by a motor connected to a regulator. There is further provided a sensor which applies a signal to the regulator each time an article situated on the supply belt passes by the sensor. The regulator varies the speed and direction of motion of the flexible element in response to the sensor signal for shifting the article transfer location and thus changing the distance between a leading article on the supply belt and a trailing article on the removal belt so that, as a result, the articles will be spaced at predetermined distances from one another on the removal belt.

14 Claims, 4 Drawing Sheets

CONVEYOR FOR FORMING A COLUMN OF UNIFORMLY SPACED ARTICLES

CROSS REFERENCE TO RELATED APPLICATION

This application claims the priority of Swiss Application No. 4423/89-6 filed Dec. 8, 1989, which is incorporated herein by reference.

BACKGROUND OF THE INVENTION

This invention relates to an apparatus for forming a column of articles, particularly chocolate bars. The apparatus includes an endless supply belt on which the individual, serially arranged articles are advanced and an endless removal belt which is arranged immediately at the downstream (discharge) end of the supply belt for taking over the articles from the supply conveyor belt and advancing them to a further processing station (such as a packing machine). The supply belt and the removal belt are both variable in their effective conveying lengths and, at the beginning and the end of the entire article-advancing track they are supported by stationarily arranged end rollers. There are provided belt deflecting elements which form the article transfer arrangement between the supply belt and the removal belt. The belt deflecting elements are mounted on a carriage which is displaceable back and forth parallel to the conveying direction and further, the supply belt and the removal belt are each guided by a respective deflecting roller movable back and forth parallel to the conveying direction.

A known apparatus of the above-outlined type is disclosed, for example, in German Offenlegungsschrift (application published without examination) 27 11 039. This publication shows a circulating, endless supply belt and a circulating, endless removal belt which, at the opposite ends of the conveyor path, are supported and guided by stationary end rollers. At the transfer location between the two belts the latter are guided on first deflecting rollers which are mounted on a carriage that is movable back and forth parallel to the article conveying direction. Further, on the carriage there are mounted second deflecting rollers at a distance from the first deflecting rollers. The carriage is reciprocated by a continuously rotating cam disc. In this manner, from the uniformly spaced articles positioned on the supply belt there are formed, on the removal belt, article groups which are advanced to a packing machine. Due to the fact that the second deflecting rollers must have a relatively large distance from one another which has an order of magnitude that is approximately one-half of the entire conveying track, the maximum carriage stroke is necessarily relatively small.

German Patent No. 3,630,791 discloses an apparatus which can form a uniform row of articles from articles arranged at random distances. This apparatus requires at least three conveyor belts which have at least two transitional portions movable back and forth parallel to the conveying direction as well as an arrangement which cyclically turns on and off the three belts. A control of such an apparatus is complicated and expensive and the conveyor output is limited because of the cyclical off-periods.

SUMMARY OF THE INVENTION

It is an object of the invention to provide an improved apparatus of the above-outlined type in which the stroke of the reciprocating carriage and the conveyor output are increased.

This object and others to become apparent as the specification progresses, are accomplished by the invention, according to which, briefly stated, a first carriage is secured to the upper flight of a flexible traction element supported by and circulating between two end rollers and further, the movable deflecting rollers are supported on a second carriage which moves as a unit with the lower reach of the traction element. The speed and direction of movement of the carriages is controlled by a regulator in response to a signal of a sensor measuring the distance between adjacent articles on the supply belt.

DESCRIPTION OF THE PREFERRED EMBODIMENT

Figure 1:
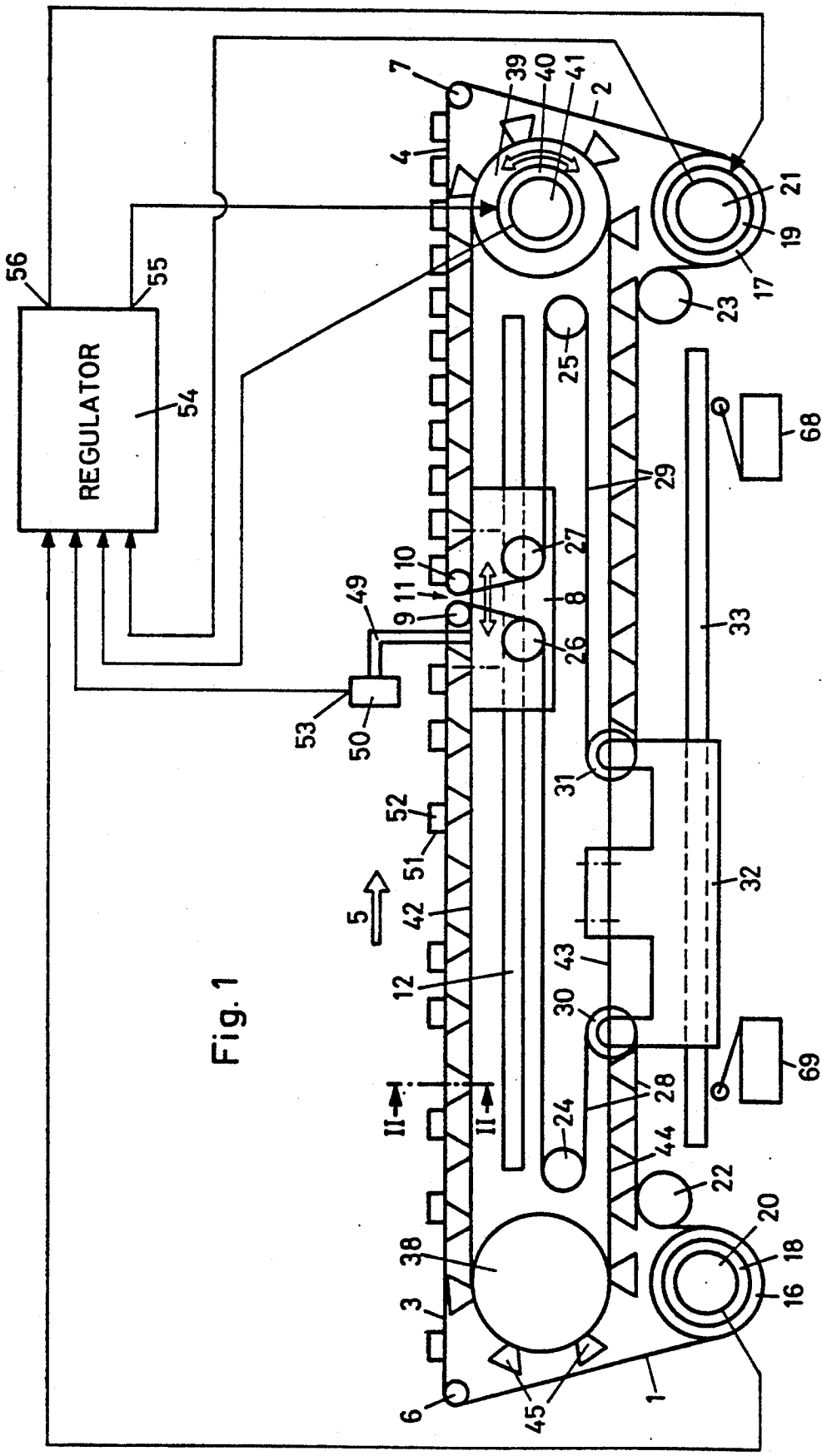
FIG. 1 is a schematic side elevational view, with block diagram, of a preferred embodiment of the invention.

Turning to FIG. 1, the apparatus according to the invention is arranged between a non-illustrated article producing machine, for example, an apparatus which makes chocolate bars and a non-illustrated packing machine.

The apparatus according to the invention includes an endless supply belt 1 and an endless removal belt 2 which adjoins the discharge end of the belt 1. The respective upper flights 3 and 4 of the belts 1 and 2 travel in the conveying direction 5 and are supported at opposite ends by stationarily mounted end rollers 6 and 7 representing, respectively, the upstream and the downstream end of the apparatus as a whole. The apparatus further includes a carriage 8 on which adjoining end rollers 9 and 10 are rotatably supported. The space between the end rollers 9 and 10 defines the article transfer location 11 between the belts 1 and 2. The carriage 8 is movable on a rail 12 back and forth parallel to the conveying direction 5. The belts 1 and 2 are trained about respective drive rollers 16 and 17 which, in turn, are rotated by a respective motor 18 and 19. The drive shafts of the two motors 18 and 19 each drive a respective tachometer 20, 21. Further, the belts 1 and 2 are trained about two additional, stationarily mounted deflecting rollers 22, 24 and, respectively 23, 25 and two rollers 26, 27 mounted on the carriage 8. Between the rollers 22 and 24 and between the rollers 23 and 25 the belts 1 and 2 form respective loops 28, 29 which are tensioned by a respective deflecting roller 30, 31. The deflecting rollers 30, 31 are rotatably mounted on a second, lower carriage 32 which is movable back and forth on a rail 33 parallel to the conveying direction 5.

Adjacent the end rollers 6 and 7, underneath the upper reach 3 and 4 of the belts 1 and 2, there are stationarily supported two sprockets 38, 39, one of which (for example, the sprocket 39) is connected with a tachometer 41 and the drive shaft of a reversible servomotor 40. The carriage 8 is secured to the upper reach 42 and the carriage 32 is secured to the lower reach 43 of an endless sprocket belt 44 supported by the two sprockets 38, 39. On the outer surface of the sprocket belt 44, thus opposite to the face which is provided with sprocket teeth, there are provided uniformly spaced support blocks 45 made, for example, of polyamide. The upper reaches 3 and 4 of the respective belts 1 and 2 are supported on the blocks 45 of the sprocket belt 44. This arrangement prevents a vertical oscillation of the belts 1 and 2 even in case of sudden accelerations of the carriage 8.

An optical barrier 50 which is mounted on the carriage 8 by means of a holding arm 49, generates a signal at its output 53 each time the trailing edge 51 of an article 52 advanced on the upper reach 3 of the supply belt 1 passes by. The output 53 is connected with the input of a regulator 54. The other inputs of the regulator 54 are connected to outputs of the tachometers 20, 21 and 41. An output 55 of the regulator 54 regulates the rpm and the direction of rotation of the servomotor 40, while a further output 56 of the regulator 54 controls the rpm of the motor 19.

Figure 2:
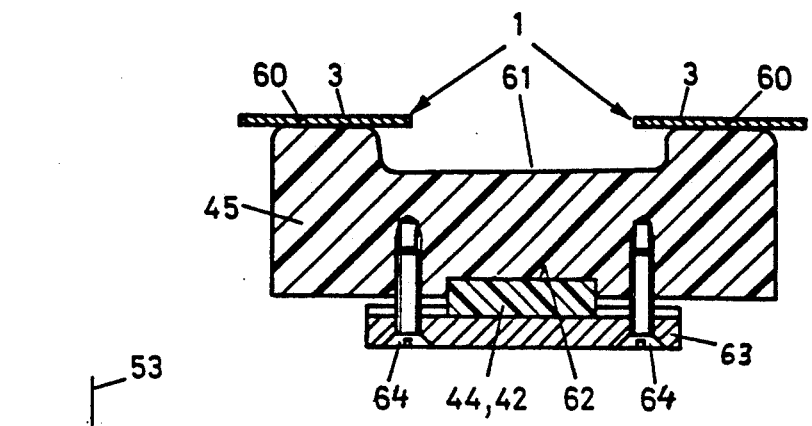
FIG. 2 is a structural sectional view of some of the components of FIG. 1, taken along line II—II thereof.

Turning now to FIG. 2, the supply belt 1 is formed of two parallel-spaced conveyor belts 60, gliding on the support blocks 45. The removal belt 2 has a similar split construction. The purpose of the dual belt construction of belts 1 and 2 is to provide two positive support areas for the articles so that they are not supported solely in their central portion. Such a disadvantageous support may easily result in an undesired turning of the article about a vertical axis in case the article is of irregular shape. The same purpose is served by a depression 61 provided in the upper side of the support blocks 45. The latter have at their underside a groove 62 receiving the sprocket belt 44. Each support block 45 is secured to the sprocket belt 44 by a respective plate 63 which is received between two teeth of the sprocket belt 44, while two screws 64 secure the plate 63 against the underside of each block 45.

Figure 3:
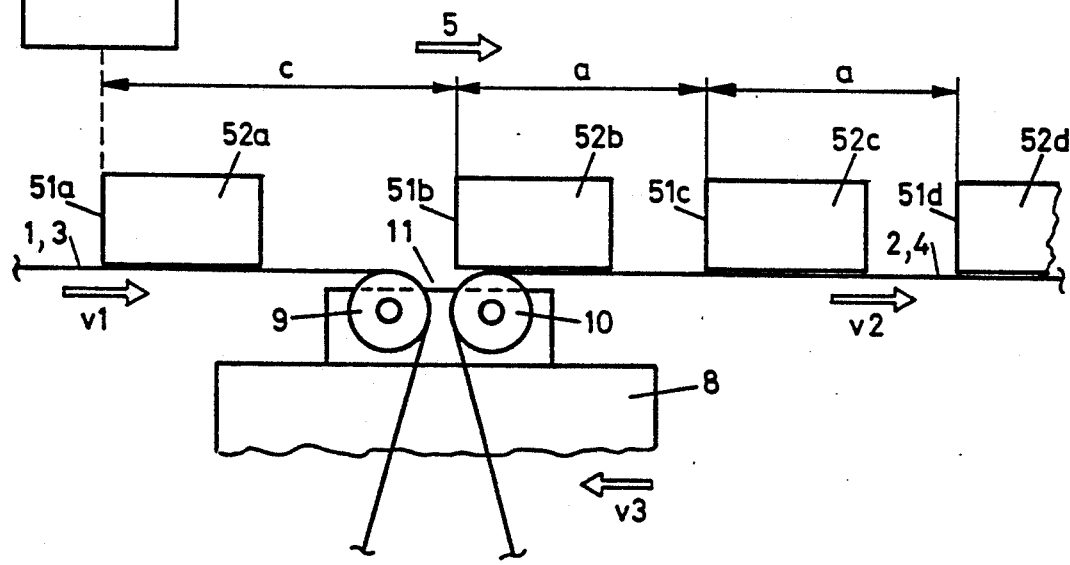
FIG. 3 is an enlarged schematic detail of one part of FIG. 1, illustrating the principle of operation of the preferred embodiment.

In the description which follows, the operation of the apparatus of FIG. 1 will be set forth in conjunction with FIG. 3.

The supply belt 1 is driven by the motor 16 with a constant velocity v1, while the removal belt 2 is driven by the motor 17 with a smaller constant velocity v2. The trailing edges 51b, 51c, 51d of the articles 52b, 52c and 52d, advanced on the removal belt 2, are arranged at a constant distance a, wherein a is measured from the trailing end of a trailing article to the trailing end of the immediately preceding, leading article. In the illustrated initial position the trailing edge 51b of the last article 52b on the removal belt 2 is situated above the transfer location 11. Before the optical barrier 50 emits a signal to indicate the presence of the trailing edge 51a of the successive article 52a on the supply belt 1, the carriage 8 is moved towards the right with velocity v2 so that the trailing edge 51b remains stationary relative to the carriage 8. As soon as a signal appears at the output 53 of the optical barrier 50 indicating a passage of the trailing edge 51a of the successive article 52a, the regulator 54 reverses the servomotor 40 so that the carriage 8 is displaced with speed v3 towards the left. The speed v3 is calculated according to the formula $$v3 = \frac{v2 \cdot c - v1 \cdot a}{c - a}$$

where c is the distance between the optical barrier 50 and the transfer location 11. For regulating the carriage speed v3 there are used the measuring signals emitted by the tachometers 20 and 21. The measuring signal of the tachometer 41 serves as a feedback into the servo circuit. The carriage speed v3 is maintained until the trailing edge 51a has reached the transfer location 11 which will occur after a delay that depends from the speed difference v1−v2 as well as from the distance c−a. After such a delay the carriage 8 again moves with speed v2 towards the right until the optical barrier 50 emits a signal in response to the passage of the successive trailing edge 51.

The carriages should move around a middle position. For this purpose it is necessary that the speed difference v1−v2 be adapted to the average distance of the articles from one another on the supply belt 1. Such an adaptation may be set either from the signals of the sensor 50 or from the mid position of the carriage 8 for setting the rpm of one of the motors 18 and 19. It is, however, feasible to switch the rpm of one of the motors, for example, motor 19, between two values back and forth, for example, by means of limit switches 68, 69 actuated by the carriage 32. When the carriage 32 actuates the limit switch 68, the speed v2 is changed to the higher speed value so that the carriage 8 is again displaced towards the right until the limit switch 69 is actuated and the speed v2 is lowered.

As a departure from the above-described mode of operation it is, as an alternative, feasible to sense the distances of the articles 52 from one another on the belt 1 by a stationary sensor and, upon the passage of each article 52 over the transfer location 11, to adapt the carriage speed to the distance of the succeeding article. This variant requires a slightly more complex computer control, but has the advantage that the carriage motions and carriage accelerations may be reduced. If this variant is used, as an additional input for the regulator 54 a measuring value of the position of the carriage 8 or the angle of rotation of the sprocket 39 is needed. It may also be expedient to arrange a second optical barrier at the transfer location 11. The signal emitted by the second optical barrier serves for changing the carriage velocity v3 corresponding to the previously determined and stored distance from the successive article 52a situated on the supply belt 1.

The apparatus according to the invention provides for a large stroke of the carriage 8 for a given structural length and a high article delivery speed. By virtue of the support of the upper reaches 3 and 4 by the support blocks 45, vertical oscillations of the belts 1, 2 are eliminated even in case of very high carriage accelerations, because the blocks 45 prevent the upper reaches 3 and 4 from sagging. For a given stroke of the carriage 8, the apparatus may be significantly shorter than prior art constructions.

Because of the fact that the articles are decelerated during their transfer onto the belt 2, it is expedient to provide the belt 2 with an anti-slide surface to ensure that the braking path for the article on the belt 2 is short and does not fluctuate in length.

Figure 4:
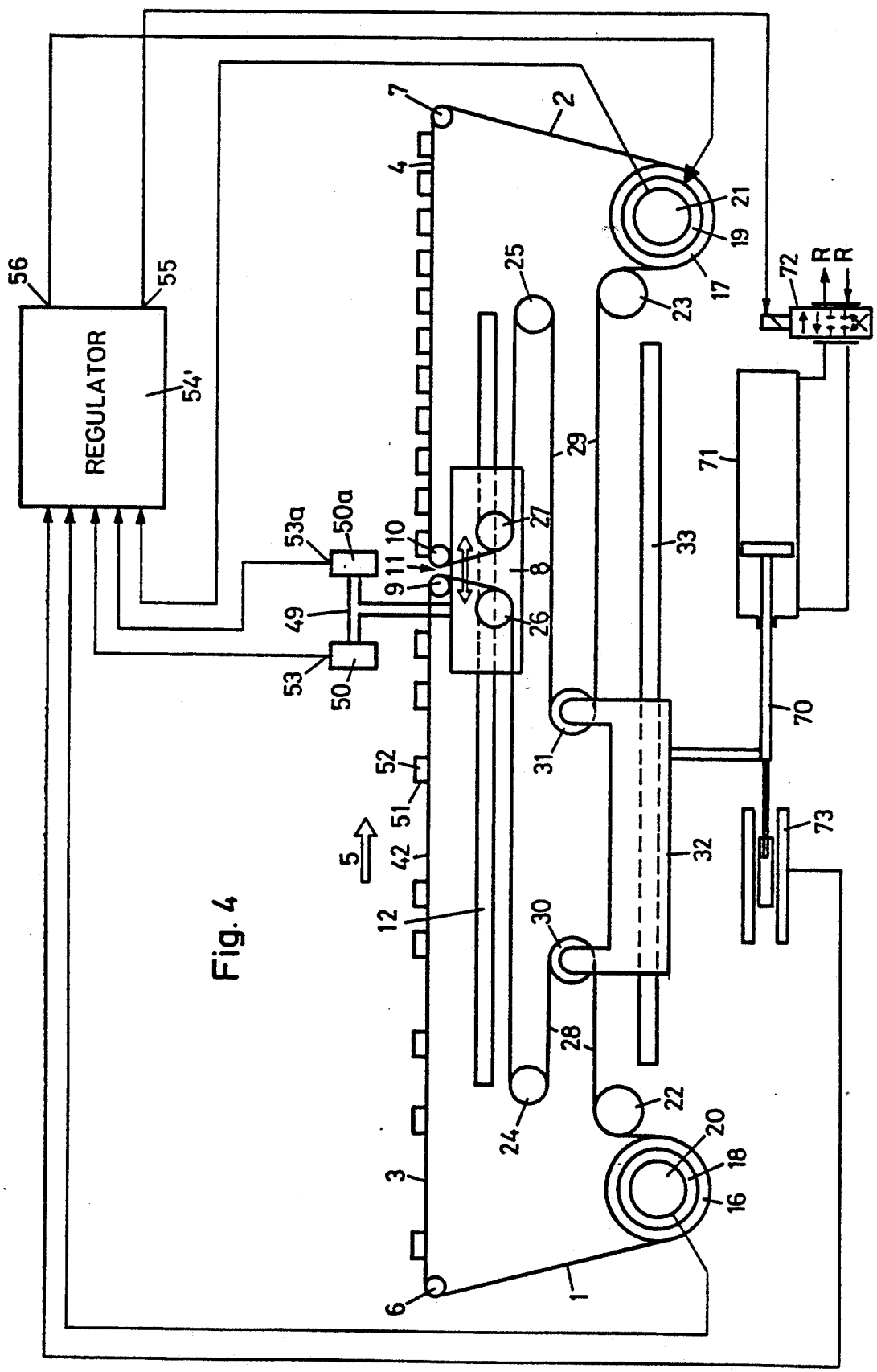
FIG. 4 is a schematic side elevational view of a second embodiment.

If only low speeds are employed, it is not necessary to support the upper reaches of the belts 1 and 2. In this case the sprocket belt 44, together with the sprockets 38, 39 may be omitted. Such an embodiment is shown in FIG. 4 where like parts are designated with the same reference numerals as in the embodiment of FIG. 1, so that a detailed description of those parts is omitted. The carriage 32 is connected to a piston rod 70 of a hydraulic cylinder 71. The cylinder is controlled by a servo valve 72 which in turn is controlled by the regulator 54'. The stroke of the piston rod 70 is sensed by a linear displacement transducer LDT 73. In this embodiment a second light barrier 50a is placed above the transfer location 11. Its output 53a produces a signal when the trailing edge of an article passes the transfer location 11.

Figure 5:
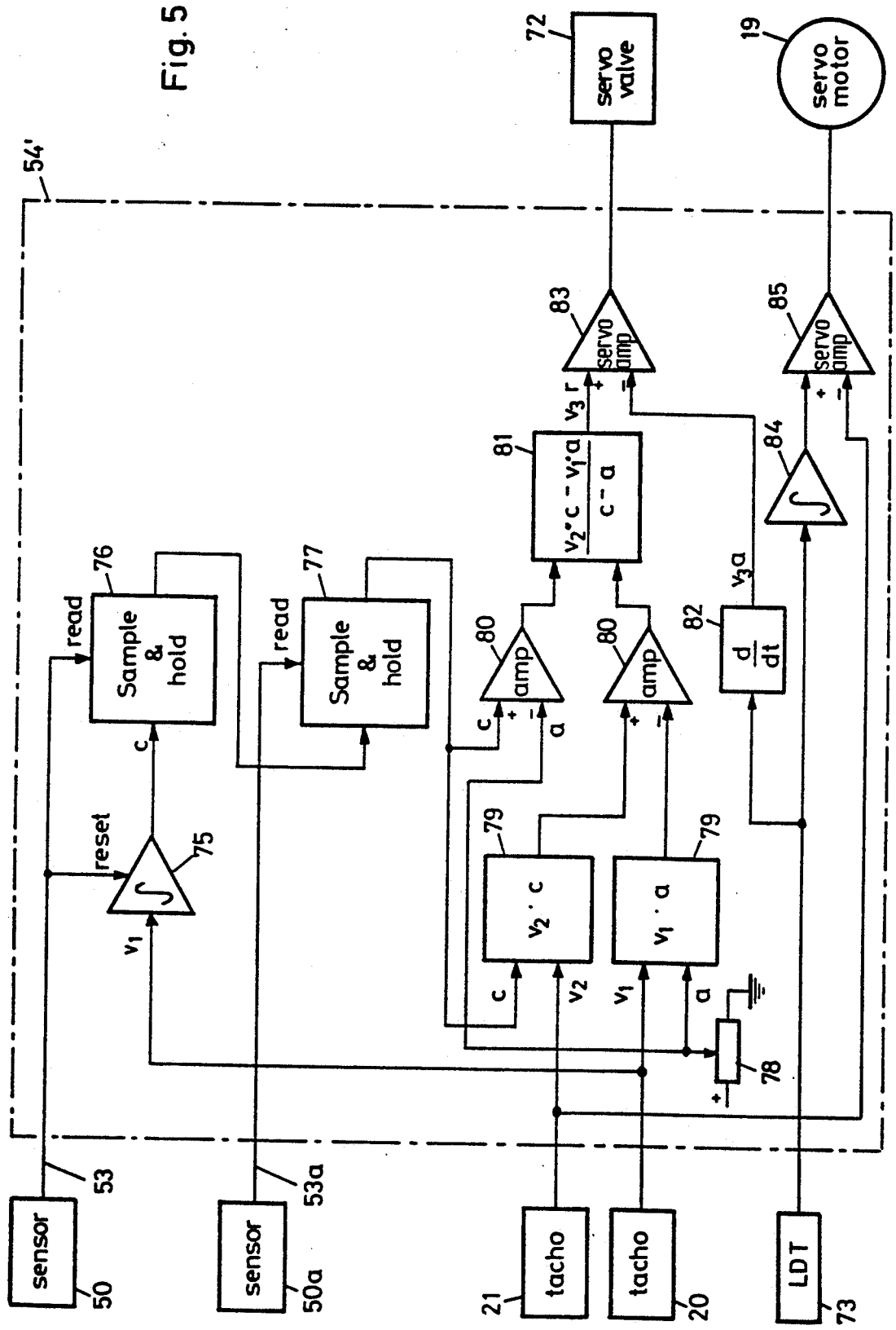
FIG. 5 is a diagram of a regulator.

FIG. 5 shows an embodiment of the regulator 54' for controlling the valve 72 and the servo motor 21. The distance c between adjacent articles on supply belt 1 is calculated by integrating the signal of tachometer 20 between two successive signals from sensor 50 in an integrator 75. Upon a signal from sensor 50 the output of integrator 75 is read into a first sample and hold circuit 76 and the integrator is reset to zero. The output of circuit 76 is read into a second sample and hold circuit 77 upon a signal from the sensor 50a. The output of circuit 77 represents the distance c between the trailing edge 51a of the article 52a approaching the location 11 and the trailing edge 51b of the article 52b at the time the latter just leaves that location 11. The desired distance a of the previously described equation is set on a potentiometer 78. Two multipliers 79, two differential amplifiers 80 and a divider 81 perform the equation noted in divider 81 to calculate the required speed $V_{3r}$ of the carriages 8, 32. The actual speed $V_{3a}$ of the carriages 8, 32 is deducted from the output signal of the LDT 73 by a differentiator 82. These two speed signals are subtracted in a servo amplifier 83 which actuates the servo valve 72. The position signal of the LDT is integrated in an integrator 84 with a high time constant. The output of integrator 84 represents the average position of carriages 8, 32. This output is the positive input of a further servo amplifier 85 which drives the servo motor 19. The feedback input to amplifier 85 is the signal from tachometer 21. The integrator 84 adjusts the speed of the removal belt 2 to the average spacing c between the articles 52 on the supply belt 1 such that the carriages 8, 32 travel around their middle position back and forth.

FIG. 5 shows an embodiment of the regulator 54' with analog circuitry. It will be understood by those skilled in the art that the same function can also be performed with digital circuitry.

The regulator 54' of FIG. 5 is also suitable for controlling the embodiment of FIG. 1. In this case the LDT 73 and the differentiator 82 are replaced by the tachometer 41, the integrator 84 performs a double integration and the servo amplifier 83 drives the servo motor 40.

It will be understood that the above description of the present invention is susceptible to various modifications, changes and adaptations, and the same are intended to be comprehended within the meaning and range of equivalents of the appended claims.

What is claimed is:

1. An apparatus for forming a column of articles having a predetermined spacing from one another, comprising an endless supply belt trained about first, second and third rollers; said first and second rollers being end rollers defining an upstream end and a downstream, discharge end of the supply belt; first drive means for continuously circulating the supply belt, whereby articles supported on a supply belt portion extending between the first and second rollers are continuously advanced by the supply belt portion at a first speed in a conveying direction;

an endless removal belt trained about fourth, fifth and sixth rollers; said fourth and fifth rollers being end rollers defining an upstream, charging end and a downstream, discharge end of the removal belt; second drive means for continuously circulating the removal belt whereby a removal belt portion, extending between the fourth and fifth rollers, is continuously advanced at a second speed in the conveying direction; said fourth roller adjoining said second roller and defining therewith an article transfer location where articles pass from the supply belt to the removal belt;

a first carriage movable parallel to said conveying direction; said second and fourth rollers being mounted on said first carriage, whereby said article transfer location is shifted upon motion of said first carriage;

a second carriage movable parallel to said conveying direction, said third and sixth rollers being mounted on said second carriage, said second carriage moving in opposite direction to said first carriage;

servo drive means for moving said first and second carriages;

sensor means for emitting a signal when an article advanced on the supply belt passes by said sensor means; and control means connected to said sensor means and said servo drive means for controlling the speed and direction of motion of said first and second carriages in response to said signal for changing the distance between a leading article on said supply belt and a trailing article on said removal belt whereby the articles are spaced at a predetermined distance from one another on said removal belt.

2. An apparatus as defined in claim 1, wherein said sensor means is mounted on said first carriage.

3. An apparatus as defined in claim 1, further comprising means for regulating the speed of said servo drive means as a function of a difference between the speeds of said supply belt and said removal belt.

4. An apparatus as defined in claim 1, further comprising means for setting a difference between the first speed of the supply belt and the second speed of the removal belt as a function of an average spacing between the articles on said supply belt.

5. An apparatus as defined in claim 1, further comprising: two spaced support rollers, and an endless flexible element trained about said support rollers and having upper and lower reaches extending parallel to said conveying direction, said first carriage being attached to said upper reach of said flexible element for movement with said upper reach as a unit, a servo motor constituting said servo drive means being connected to one of said support rollers.

6. An apparatus as defined in claim 5, wherein said flexible element is a sprocket belt.

7. An apparatus as defined in claim 1, wherein said supply belt and said removal belt are each formed of two parallel-spaced conveyor belts.

8. An apparatus as defined in claim 5, further comprising a plurality of support blocks mounted in a spaced relationship on said flexible element; said upper reach of said flexible element being situated below and parallel with said supply belt portion and said removal belt portion; said supply belt portion and said removal belt portion being supported on said support blocks.

9. An apparatus as defined in claim 8, wherein said supply belt and said removal belt are each formed of two parallel-spaced conveyor belts; each said support block having, on a face oriented outwardly from said flexible element, a depression situated between said parallel-spaced conveyor belts when respective said support blocks are in a supporting relationship with said supply belt or said removal belt.

10. An apparatus as defined in claim 8, wherein said support blocks are plastic.

11. An apparatus as defined in claim 10, wherein said support blocks are polyamide.

12. An apparatus as defined in claim 5, wherein one of said two support rollers is situated adjacent said upstream end of said supply belt and the other of said two support rollers is situated adjacent said downstream end of said removal belt.

13. An apparatus as defined in claim 4, wherein said means for setting the difference between said first and second speeds is comprised in said control means; further wherein one of said first and second drive means comprises a servo motor connected to said control means for controlling an rpm of said servo motor by said control means.

14. An apparatus for forming a column of articles having a predetermined spacing from one another, comprising
(a) an endless supply belt formed of two parallel-spaced conveyor belts and being trained about first, second and third rollers; said first and second rollers being end rollers defining an upstream end and a downstream, discharge end of the supply belt; first drive menas for circulating the supply belt, whereby articles supported on a supply belt portion extending between the first and second rollers are advanced by the supply belt portion in a conveying direction;
(b) an endless removal belt formed of two parallel-spaced conveyor belts and being trained about fourth, fifth and sixth rollers; said fourth and fifth rollers being end rollers defining an upstream, charging end and a downstream, discharge end of the removal belt; second drive means for circulating the removal belt whereby a removal belt portion, extending between the fourth and fifth rollers, is advanced in the conveying direction; said fourth roller adjoining said second roller and defining therewith an article transfer location where articles pass from the supply belt to the removal belt;
(c) a first carriage movable parallel to said conveying direction; said second and fourth rollers being mounted on said first carriage, whereby said article transfer location is shifted upon motion of said first carriage;
(d) a second carriage movable parallel to said conveying direction, said third and sixth rollers being mounted on said second carriage, said second carriage moving in opposite direction to said first carriage;
(e) two spaced support rollers;
(f) an endless flexible element trained about said support rollers and having upper and lower reaches extending parallel to said conveying direction, said first carriage being attached to said upper reach of said flexible element for movement with said upper reach as a unit;
(g) a plurality of support blocks mounted in a spaced relationship on said flexible element; said upper reach of said flexible elemenn being situated below and parallel with said supply belt portion and said removal belt portion; said supply belt portion and said removal belt portion being supported on said support blocks; each said support block having, on a face oriented outwardly from said flexible element, a depression situated between said parallel-spaced conveyor belts when respective said support blocks are in a supporting relationship with said supply belt or said removal belt;
(h) a servo motor for moving said first and second carriages; said servo motor being connected to one of said support rollers;
(i) sensor means for emitting a signal when an article advanced on the supply belt passes by said sensor means; and
(j) regulator means connected to said sensor means and said third drive means for varying the speed and direction of motion of said first and second carriages in response to said signal for changing the distance between a leading article on said supply belt and a trailing article on said removal belt whereby the articles are spaced at a predetermined distance from one another on said removal belt.

* * * * *